US010482000B2

(12) United States Patent
Vikjord et al.

(10) Patent No.: US 10,482,000 B2
(45) Date of Patent: Nov. 19, 2019

(54) MACHINE LEARNED DECISION GUIDANCE FOR ALERTS ORIGINATING FROM MONITORING SYSTEMS

(71) Applicant: Microsoft Technology Licensing, LLC, Redmond, WA (US)

(72) Inventors: Vidar V. Vikjord, Tromso (NO); Jan-Ove Karlberg, Tromso (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 15/495,255

(22) Filed: Apr. 24, 2017

(65) Prior Publication Data
US 2018/0307582 A1    Oct. 25, 2018

(51) Int. Cl.
*G06F 11/36*    (2006.01)
*G06N 7/00*    (2006.01)
*G06N 5/04*    (2006.01)
*G06N 20/00*    (2019.01)

(52) U.S. Cl.
CPC .......... *G06F 11/366* (2013.01); *G06F 11/362* (2013.01); *G06N 5/045* (2013.01); *G06N 7/005* (2013.01); *G06N 20/00* (2019.01)

(58) Field of Classification Search
CPC combination set(s) only.
See application file for complete search history.

(56) References Cited

U.S. PATENT DOCUMENTS

| 6,954,678 | B1* | 10/2005 | Phan | H01L 22/26 257/E21.528 |
| 7,979,371 | B2* | 7/2011 | Lake | G06N 7/02 706/21 |
| 8,041,663 | B2* | 10/2011 | Beaty | G06Q 10/02 705/5 |
| 8,713,531 | B1 | 4/2014 | Pettis et al. | |
| 8,751,421 | B2 | 6/2014 | Anderson et al. | |
| 9,378,014 | B2* | 6/2016 | Wilson | G06F 8/43 |

(Continued)

FOREIGN PATENT DOCUMENTS

EP    3136244 A1    3/2017

OTHER PUBLICATIONS

Flynn, Lori, "Prioritizing Alerts from Static Analysis to Find and Fix Code Flaws", https://insights.sei.cmu.edu/sei_blog/2016/06/prioritizing-alerts-from-static-analysis-to-find-and-fix-code-flaws.html, Published on: Jun. 6, 2016, 9 pages.

(Continued)

*Primary Examiner* — Amine Riad

(57) ABSTRACT

Described herein is a system and method for determining whether a detected issue in a computing system is a bug introduced by a developer or an intermittent issue. When an issue is detected, information about the issue is received. A determination is then made as to whether the issue is a new issue or whether it has been previously detected. When it is determined that the issue is a new issue, information about the issue is stored in a storage device. A feature vector is generated for the issue and is analyzed to determine a probability that the issue is a bug. When it is determined that the issue is a bug, the occurrence of the issue is reported to a user of the system that can correct the bug. Once the bug is corrected, the correction is provided back to the system and is used to train the system.

20 Claims, 9 Drawing Sheets

(56) References Cited

U.S. PATENT DOCUMENTS

| | | | |
|---|---|---|---|
| 9,442,983 | B2 | 9/2016 | Higginson et al. |
| 9,805,526 | B2* | 10/2017 | Leung .................. G07C 5/0841 |
| 2005/0120273 | A1 | 6/2005 | Hudson et al. |
| 2007/0174711 | A1* | 7/2007 | Uehara ............... G06F 11/3672 714/38.1 |
| 2008/0313602 | A1* | 12/2008 | Tillmann ............ G06F 11/3636 717/106 |
| 2009/0063387 | A1* | 3/2009 | Beaty ...................... G06N 5/04 706/50 |
| 2013/0097706 | A1 | 4/2013 | Titonis et al. |
| 2013/0179863 | A1* | 7/2013 | Vangala .................... G06F 8/74 717/124 |
| 2013/0304333 | A1* | 11/2013 | Fuehrer ................ G08G 1/0112 701/51 |
| 2013/0339921 | A1* | 12/2013 | Bassin .................. G06F 11/008 717/101 |
| 2014/0109053 | A1 | 4/2014 | Vasudevan et al. |
| 2015/0019564 | A1 | 1/2015 | Higginson et al. |
| 2015/0347212 | A1 | 12/2015 | Bartley et al. |
| 2016/0321160 | A1 | 11/2016 | Joo et al. |
| 2017/0123963 | A1* | 5/2017 | Koren ................. G06F 11/3688 |
| 2017/0286199 | A1* | 10/2017 | Soini ..................... G06F 11/079 |
| 2019/0108001 | A1* | 4/2019 | Hauser ...................... G06F 8/30 |

OTHER PUBLICATIONS

Thung, et al., "An Empirical Study of Bugs in Machine Learning Systems", In Proceedings of IEEE 23rd International Symposium on Software Reliability Engineering, Nov. 27, 2012, 10 pages.

Guruswamy, Karthik, "Data Science—Machine Learning vs Rules Based Systems", https://aster-community.teradata.com/community/learn-aster/blog/2015/10/06/data-science-machine-learning-vs-rules-based-systems, Published on: Oct. 6, 2015, 5 pages.

Alenezi, et al., "Bug Reports Prioritization: Which Features and Classifier to Use?", In Proceedings of 12th International Conference on Machine Learning and Applications, Dec. 4, 2013, pp. 112-116.

Bhattacharya, et al., "Automated, highly-accurate, bug assignment using machine learning and tossing graphs", In Journal of Systems and Software, vol. 85, Issue 10, Oct. 2012, pp. 2275-2292.

"International Search Report and Written Opinion Issued in PCT Application No. PCT/US2018/026380", dated Jul. 18, 2018, 16 Pages.

* cited by examiner

MACHINE LEARNED DECISION GUIDANCE FOR ALERTS ORIGINATING FROM MONITORING SYSTEMS

BACKGROUND

Automated integration testing and monitoring is an important tool for reducing the number of bugs in various software systems. However, as these software systems grow in complexity and are distributed across a number of different platforms, interoperability between components becomes subject to intermittent failures. In some cases, the failures can be software related issues. For example, as new software is implemented into the system, a developer may inadvertently introduce one or more bugs into the system. In such cases, the developer may need to identify the bug and provide one or more updates to the software. In other cases, the failures may be related to network and/or hardware issues. When these errors occur, they may appear as bugs but are in reality, false positives. As these failures are not caused by the newly implemented code, the developer may spend unnecessary time investigating these failures.

It is with respect to these and other general considerations that examples have been described. Also, although relatively specific problems have been discussed, it should be understood that the examples should not be limited to solving the specific problems identified in the background.

SUMMARY

This disclosure generally relates to a system and method for determining whether a detected issue or failure in a software system is the result of a programming induced bug or due to some other cause. When a failure or other issue with the software system is detected, the system described herein guides decision making processes of developers and helps them recognize and address software issues (e.g., bugs caused by the addition of source code into the software system) rather than tracking and attempting to fix false positives. As such, the system described herein allows developers to spend their time more efficiently. As issues are resolved, data corresponding to the various detected issues (e.g., the cause of the issue, how the issue was fixed, etc.) is fed back into the system to provide better guidance and more accurate models.

Accordingly, described herein is a method for automatically determining whether a detected issue in a computing system is a bug. This method includes receiving information about a detected issue and storing the information about the detected issue in a storage device. A feature vector for the detected issue is generated and analyzed to determine a probability that the detected issue is a bug. In some examples, the analysis is based, at least in part, on the feature vector. When the probability is above a threshold, the detected issue is reported to a client device.

Also described is a system, comprising at least one processing unit and a memory storing computer executable instructions that, when executed by the at least one processing unit, causes the system to perform a method for determining whether a detected issue in a software system is a bug or a false positive. This method includes receiving information about a detected issue and comparing a fingerprint of the detected issue to one or more fingerprints of previously detected issues to determine whether the detected issue is new. When it is determined that the detected issue is new, information about the detected issue is stored in a storage device. The information about the detected issue is also provided to a feature generation component that generates a feature vector for the detected issue. The feature vector may then be provided to an evaluation component that analyzes the feature vector to determine a probability that the detected issue is a bug. An ordered list of detected issues may then be provided to a client device.

The present disclosure also describes a computer-readable storage medium storing computer executable instructions that, when executed by a processing unit, causes the processing unit to perform a method comprising generating a feature vector for a detected issue using information associated with the detected issue and providing the feature vector to one or more models of an evaluation component. The one or more models of the evaluation component may analyze the feature vector to determine a probability that the detected issue is a bug. The occurrence of the detected issue is then reported. Once the detected issue is reported, a fix to the detected issue may be received. When received, at least one of the one or more models is updated using the fix to the detected issue.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
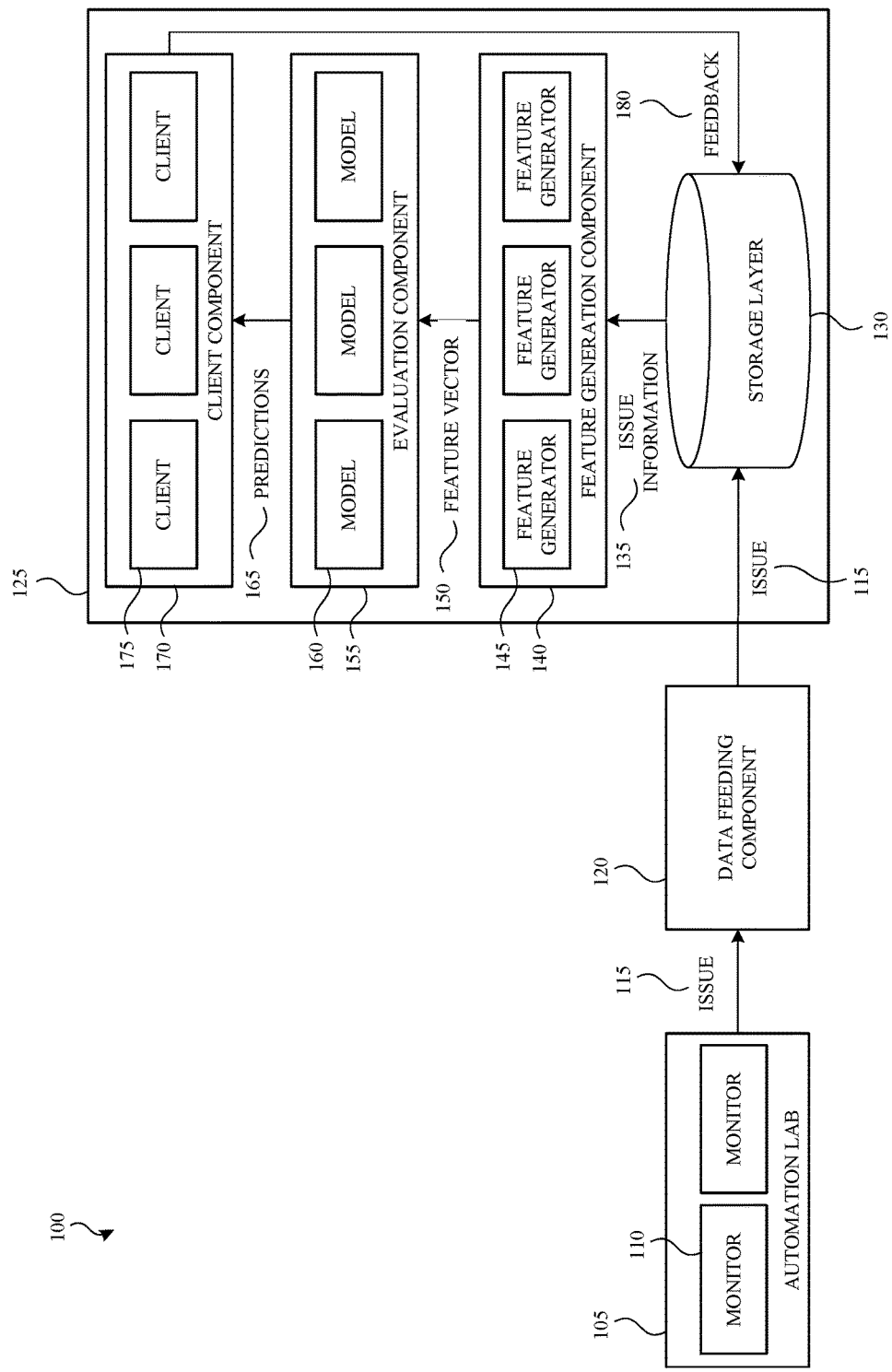
FIG. 1 illustrates a system for evaluating and ranking alerts that arise in a software system according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Automatic testing and monitoring of software systems is an integral part of the software development process. This disclosure describes a system and method that determines whether a detected issue or failure in the software system is a bug or whether it is a false positive.

For example, at any point in time, many different software components may be subjected to various testing processes to ascertain whether a change in one software component negatively impacts another component and/or whether the change negatively impacts the system as a whole. In some cases, integration of various software components may be tested as new software is built and/or as existing software components are modified.

However, due to the complexity of an automation lab that automatically tests the integration of the components, spurious and intermittent issues may arise. In some cases, these issues break the integration between some components and result in the reporting of a false positive. The false positive may be communicated back to the developer as a bug or alert. When these issues are reported, the developer may spend valuable time trying to fix an error that occurred through no fault of their own.

The system described herein is configured to scan each reported bug or alert that originates from the automation lab and provide developers with decision support about which bugs and/or alerts the developer should prioritize. The system may also automatically resolve issues that are presumed or otherwise determined to be false positives.

For example, when an issue, failure or other alert (collectively referred to herein as an "issue") is detected, information about the issue is transmitted from an automation lab to a storage layer. A feature generation component accesses the storage component and generates a feature vector for the issue using the stored information. The feature vector is then transmitted to an evaluation component that hosts various models that are used to predict or otherwise determine whether a particular issue is a false positive or is, in actuality, a bug.

As used herein, the term "bug" means a software bug. For example, the software bug may be an error in a computer program or system, caused by the alteration or addition of source code, that causes the computer program or system to produce an incorrect result, an unexpected result, and/or behave in an inconsistent, an unexpected, or an unintended manner. As used herein, the phrase "false positive" is a result that incorrectly indicates that a detected issue is a bug such as defined herein.

As will be explained below, each model in the evaluation component may interact with the storage component and the feature generation component and be updated and trained as new data becomes available. For example, once the model has determined a probability as to whether an issue is a bug, that information is sent to a developer. Although the term "probability" is used herein, the models in the evaluation component may be configured to rank the detected issues or provide some other indication that a determination of whether an issue is a bug has been made. For example, each of the issues could be given a score (e.g., a confidence score or some other score). If the score is above (or below) a threshold, it may indicate whether an issue is a bug introduced by a developer or some other intermittent issue.

The developer reviews the issues and determines whether the issue is a bug, provides a fix (e.g., updates the source code) to the bug and provides this information back to the system. This information may be used to update the training models and/or the feature generation component so they become more accurate as time progresses.

These and other examples will be described in more detail below with respect to FIGS. 1-4.

FIG. 1 illustrates a system 100 for evaluating and ranking issues that arise in a software system according to an example. In examples, the software system may include various modules and components that work together to perform a function. These examples include operating systems, applications (e.g., word processing applications, spreadsheet applications, internet browsers, and the like), cloud computing environments and so on.

Over time, the software system, or various components of the software system, may be updated by developers. As the updates are being performed, the various components of the software system may be tested (separately or with other software and/or hardware components) to determine whether an update to one component will negatively impact another component of the software system and/or the software system as a whole.

In the system 100, the software system to be tested, including all of its components and associated hardware (e.g., networking equipment, databases, servers etc.) may be executed and tested in the automation lab 105. As briefly described above, the automation lab may continuously test the various software components of the software system as new software is built and/or as existing software components are modified.

In examples, the automation lab includes one or more monitors 110. The monitors 110 detect whether an issue has arisen during the testing process. In some cases, different monitors 110 monitor different parts of the software system. For example, a first monitor may cover one or more software components of the software system while a second monitor covers one or more hardware components that are associated with or that otherwise interact with the software system. The automation lab 105 may be configured to continuously execute various test cases. In other implementations, the automation lab 105 may be configured to run test cases on-demand.

If one or more monitors 110 in the automation lab detects an issue, raw information about the issue 115 is transmitted to a data feeding component 120. In examples, the data feeding component 120 is configured to handle all issues 115 that are generated or otherwise detected from the automation lab 105.

Once the issues 115 are received, the data feeding component 120 transforms the information about the issue 115 into a structured schema that facilitates storage. In some cases, the information about the issue 115 handled by the data feeding component 120 includes stack traces, crash dumps and so on. In addition to this information, the data feeding component 120 may also receive information about the current state of the automation lab 105.

From this information, the data feeding component 120 can determine the context in which the issue 115 occurred. For example, the data feeding component 120 can determine the build number of the source code being tested, the current time and date, what version of the operating system a host was running, and other such information.

The data feeding component 120 may also be configured to generate a fingerprint of the various issues 115 via a binning functionality. Once the fingerprint of the issue 115 has been established, it is compared against fingerprints of other issues 115 that have already been reported to the data feeding component 120. If it is determined that the current issue 115 is a new issue, information about the issue 115, along with its fingerprint, are stored. In some cases, binning allows for the generation of various temporal statistics (e.g., number of weekly, monthly, and lifetime hits) of various issues 115 that may be present in the software system.

If it is determined that the issue 115 is a new issue, the data feeding component 120 pushes the information about the issue 115 to an issue analysis component 125. The issue analysis component 125 analyzes the information, determines a probability of whether the issue 115 is a bug or a false positive and uses that information to train its evaluation models.

In some cases, the issue analysis component 125 includes or is otherwise associated with a storage layer 130. The storage layer 130 receives information about the issue 115 from the data feeding component 120. In some examples, the storage layer 130 may be extensible and editable. The storage layer 130 may also be configured to store developer feedback on various issues that are detected as well as any received and associated feedback provided by a developer. The storage layer 130 may also allow various developers and/or components of the system 100 to execute scoped queries (e.g., queries over a subset) over the stored data.

The issue analysis component 125 also includes a feature generation component 140. The feature generation component 140 includes one or more feature generators 145. Each feature generator 145 is configured to generate a feature vector 150 that is associated with a particular issue 115.

In some instances, there may be many different classes of issues that exist in a software system. For example, one or more bugs may be related to different software components and/or one or more different development teams. Additionally, the various issues 115 might exhibit different behaviors. Accordingly, each feature generator 145 in the feature generation component 140 may be configured specifically for each type of issue. As such, the feature generation component may include many different feature generators 145.

For example, each feature generator 145 may be configured to look for information that relates to particular issue 115. If information relating to a particular issue is found in the issue information 135, a feature vector associated with that particular issue is generated. For example, a particular feature generator may be configured to count how many times the work "error" and "memory" occur in a stack trace. Thus, if the feature generator received a stack trace of "Memory error in memory location 1", the feature vector generated by the feature generator would be "[1,2]" as the word "error" occurs once and the word "memory" occurs twice. However, if the stack trace is empty or not present, the resulting feature vector may be "[0,0]." Once the feature vector is generated, that information is passed to the evaluation component.

In some cases, each feature generator 145 may retrieve various data points from the storage layer 130. Each feature generator 145 may also perform one or more transformations on the data based, at least in part, on the configuration of the feature generator 145.

For example, if a feature generator 145 is configured to look for a particular type of issue or is associated with a particular software component or hardware component, the feature generator 145 may perform a specified type of transformation on the data. Examples of such transformations could be normalization, counting occurrences of certain key words from stack traces, binning, or otherwise extracting or generating features from the raw data available in the storage layer 130. The feature generator 145 uses the transformed information to generate a feature vector 150.

Once the feature vector 150 has been generated, the feature vector 150 is passed to an evaluation component 155. The evaluation component 155 includes one or more models 160. In some examples, each model 160 has a one-to-one correspondence with a particular feature generator 145.

For example, each feature generator 145 is responsible for generating feature vectors for one model 160. In this way, the system 100 may be comprised of highly accurate domain specific models 160. Further, this enhances flexibility of the system 100 as the different feature generators 145 can be developed and experimented with by different engineering teams independently, given that they read from the storage layer 130.

Although a one-to-one correspondence is mentioned, a feature generator 145 may provide feature vectors 150 to many different models 160. Likewise, a single model 160 may receive feature vectors 150 from various different feature generators 145.

In the examples described herein, the evaluation component 155 is used to determine a probability or otherwise predict whether the received feature vector 150 is associated with a bug or whether it is associated with a false positive. For example, the model 160 may be configured to determine the probability of each issue being a bug or intermittent noise, predicting whether this issue belongs to a given team and so on. In examples, it may be up to the developers that use the system 100 to know which classes of bugs originate from their automation lab 105. As such, a developer may create and/or update their own models 160 and feature generators 145 based on individual need.

In some cases, an issue may arise in which a model 160 in the evaluation component 155 is not equipped to handle a prediction based on the information contained in the feature vector 150. In such cases, the system 100 may notify a developer and permit the creation of another model 160 and/or feature generator 145.

Each model 160 deployed in the evaluation component 155 is also capable of interacting with the storage layer 130 and the feature generation component 140. As such, each model 160 may be updated and re-trained as various updates and/or feedback is provided and as new training data becomes available.

In some instances, each feature generator 145 and each model 160 in the evaluation component 155 operate independently from each other. As such, each feature generator 145 and/or each model 160 can be trained at any time. Further each model 160 may be a different type of model. For example, one model could be a support vector machine (SVM) ranker that is trained in batches while another model could be a k-nearest neighbor (KNN) ranker trained in an online fashion.

Once one or more models 160 of the evaluation component 155 has analyzed the feature vector 150, a prediction 165 is generated and provided to a client component 170. The client component 170 may include one or more clients 175. Each of the one or more clients 175 may interface with the various other components described above.

For example, a first client may be configured to interact with a specific model and feature generator while a second client is configured to interface with a different model and feature generator. The first client may be configured to examine new issues (e.g., issues not yet inspected by a developer) and uses the model 160 to predict the probability that the issue is a false positive or a bug. This client 175 may then serve a developer a prioritized list of the active issues that are most likely to be a bug.

Likewise, the second client may be configured to interact with the storage layer 130 and search for bugs or other issues 115 that are still outstanding. The second client may request its associated feature generator 145 to create a feature vector 150 and provide that feature vector 150 to the associated model 160. As described above, the model 160 determines a probability as to whether the detected issue 115 is a bug or whether it is a false positive. This information may also be sent to a developer such as described above.

When the developer accesses the system 100, the developer may choose one or more bugs to investigate. During the investigation, the developer may determine that the detected issue 115 is a bug and provide a fix for the bug. This information, shown as feedback 180 in FIG. 1, is then transmitted to and stored in the storage layer 130. The feedback 180 may also be provided to the various feature generators 145 in the feature generation component 140 and/or the models 160 in the evaluation component.

In some instances, the developer may determine that the reported issue 115 is a false positive. In these cases, feedback 180 about the issue 115 (e.g., feedback indicating that issue 115 was not a bug caused by the developer) is also provided back to the storage layer 130.

In some instances, the client 175 may also provide the feedback directly to the feature generator 145 and/or the model 160 that the issue is associated with. For example and as described above, each feature generator 145 and/or model 160 may be associated with or otherwise configured to handle a particular issue 115. Thus, when the same issue, or a similar issue is detected at a later time, the feature generator 145 and/or the model 160 may be better trained on how the handle the issue 115 as well as making a determination as to whether the detected issue 115 is a bug or a false positive. In other cases, information about a particular issue may be stored in the storage layer 130. If the same or similar issue arises, the information about the issue is compared to the issue information in the storage layer 130 and is then passed to a stateless feature generation and evaluation flow. In some instances, the stateless feature generation and evaluation flow may be similar to the flow of operations described herein.

The following is an example of how the system 100 described above may be used. Although specifics are described, these are meant to be examples only and the system 100 may be used in a number of different scenarios.

In this example, a team of developers may develop software that analyzes documents. An analytics component of the software, as well as the testing of this component, involves multiple different machines and pieces of software. For example, a test corpus of documents may be hosted on storage server. A crawler may be running towards the storage server and be configured to extract text from the documents. Once the text has been extracted, the text may be passed to the analytics component. The system may also include another server running a database system that stores the results from the analytics component.

In this example, the software development team utilizes the system 100 described above. For example, when an issue is detected in an automation lab, information about the issue is transmitted to a storage layer (e.g., storage layer 130). A feature generator (e.g., feature generator 145 of the feature generation component 140) extracts data from the information that has been deemed effective for detecting false positives. For example, the feature generator may extract information regarding the total number of times the issue has occurred (e.g., life time hits), the total number of times each issue has occurred the last month (e.g., hits last month), the number of times each issue has occurred the last week (e.g., hits last week), the build number at which the issue last occurred and the final resolution of the issue (e.g. whether the issue was fixed or a determination that the issue is not reproducible).

Although specific information mentioned, this is for example purposes only. Accordingly, a feature generator may not extract as much of the information as stated or may extract additional information.

Once this information has been collected, some of the information may be further normalized. For example, the number of hits last week and the number of hits last month may be divided by the total number of lifetime hits. These numbers can be used to determine temporal trends such as whether a particular issue has occurred more often the last week than in the weeks preceding it.

The feature generation component uses this information to generate a feature vector and provides it to a model (e.g., model 160) in an evaluation component (e.g., evaluation component 155). As discussed above, the model then determines a probability of whether the issue is a bug or a false positive. In this example, the output from the model is that each new issue (e.g., issues that have not been previously identified, researched and/or fixed by a developer), is assigned a probability of being a false positive. The model then presents these predictions to a client (e.g., dine 175). The client may then present the new issues to the software development team. In some cases, the issues may be ordered using the probability that was determined by the model.

The developer may select an issue, investigate it, and identify the issue as a bug and fix it or identify the issue as a false positive. If the developer determines that the issue is a bug, the developer fixes the bug and an issue entry associated with the detected issue is updated in the storage layer. If the developer determines that the issue is not a bug (e.g., the issue is a false positive) that information is also fed back into the storage layer so that the system can learn from it in the future.

The following is another example as to how the system described herein may work. In this example, a developer on the software development team may open or otherwise access the client (or may directly access the storage layer), and query the storage layer for issues that have not yet been resolved (e.g., bugs that have not yet been fixed, deemed false positives or deemed not reproducible). These issues are fed to the feature generation component, which outputs a set of feature vectors for the issues.

The feature vectors are fed to the model evaluation components, which yield a probability of the issue being a false positives or a bug. The issues may be ordered according to the likelihood of being real issues (or may be ordered in some other manner such as, for example, longest amount of time the issue has been present, the number of times the issue has arisen, and so on).

The developer chooses an issue (e.g., an issue that has the highest probability of being a bug) and investigates it. If the developer determines that the issue is a bug, the developer fixes the bug. An issue entry in the storage layer is updated with the information that the issue was a bug and the fix that was performed. If the issue was determined by the developer to be a false positive, that information is also fed back into the storage layer so that the system can learn from it in the future. The developer may then select a new issue and the cycle repeats.

The above described processes may be used to improve accuracy of the system 100 by using both human intervention and knowledge with computer based analytics. As such, developers may increase the quality of the training data with every issue that is handled. In some cases, the models within the system may be trained at different times and with different frequencies. For example, the training of the models may be dependent on how frequently the feedback is incorporated in the model and may also be dependent on the type of model and how quickly issues are fixed. For example, in an online algorithm, each new item of feedback could be incorporated immediately. Conversely, a model that is built in a batch computation fashion might be regenerated once per hour, once per day, once per week and so on.

In some instances, the system 100 described above may be used to automatically close issues that are deemed to be intermittent or spurious in nature. In some cases, this determination may be made based, at least in part, on a probability determination. For example, a client of the system may compare the probability of each issue being a false positive to a determined threshold. If the threshold is exceeded, the client updates the issue entry in the storage layer to signify that it was not reproducible. In some cases, the determination may be based on a previous determination made by a developer.

In some cases, and in order to prevent the system from continuing to evaluate issues without human intervention, the issues may be tagged in a way so that they are not included in the data set used for training new models. However, as the storage layer representation of the issues can be edited at a later time, tools can be built to allow for developers to agree with the decisions made by the system and/or to correct any mistakes that have been made by the automatic determination. In either case, the decision to accept or correct the data may be used to train the models and/or the feature generators.

Although the system has been described with respect to an automation lab, the system 100 described above could be integrated within any other system. Likewise, the system 100 could observe another system from the outside. In yet another example, multiple systems (e.g., an integrated system and an outside system) could be used on a single software system.

Likewise, the system 100 may be implemented to run as a rich client running on a single host, as a server side system (e.g., an offering as a web interface) or in any combination thereof (e.g., with a server backend and a thinner client front end).

Figure 2:
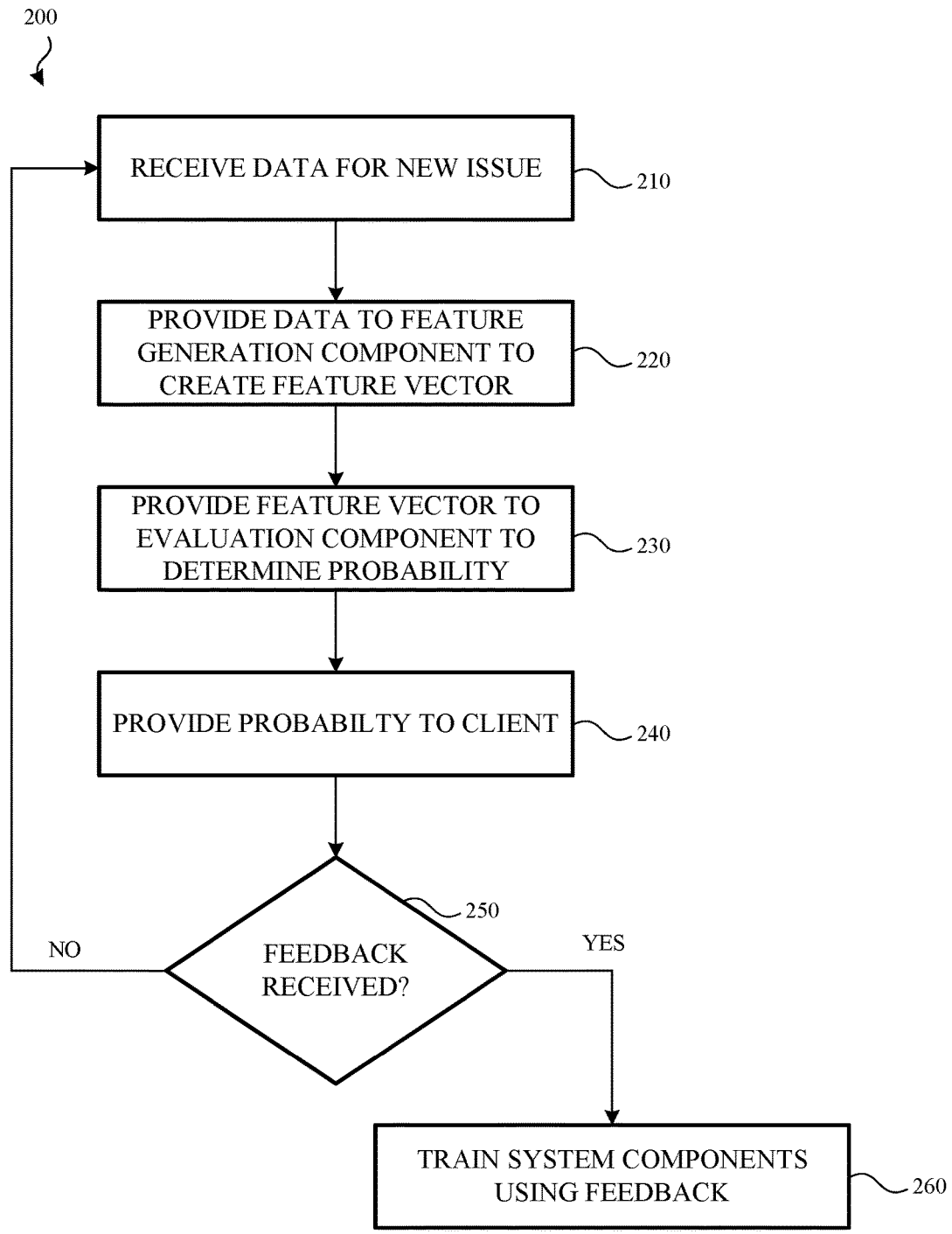
FIG. 2 illustrates a method for evaluating and ranking issues that arise in a software system according to an example.

FIG. 2 illustrates a method 200 for evaluating and ranking issues that arise in a software system according to an example. In some examples, the method 200 may be used by a system 100 such as described above with respect to FIG. 1.

Method 200 begins at operation 210 in which data associated with a detected issue is detected and provided to the system. In this example, operation 210 may also be used to determine whether the issue is a new issue or whether this issue has been previously detected. The information about the issue may be provided to the system by a data feeding component such as described above. Additionally, the information about the issue may be stored in a data storage component.

Once the data about the issue has been received, flow proceeds to operation 220 and the data is provided to a feature generation component. The feature generation component analyzes the information and, based on the model that it will transmit information to, generates a feature vector that describes, identifies or is otherwise associated with the issue. For example, the feature generation component may include one or more feature generators that are used to determine whether a particular word is present in the information, the number of times a particular error is present in the information etc. The feature generator then generates a feature vector such as described above.

In operation 230, the feature vector is provided to an evaluation component. In some examples, the evaluation component has one or more models that evaluate the feature vector and determine a probability that the feature vector identifies or is otherwise associated with a bug. The model may be configured to look for a specific type of bug. As such, the model may receive a feature vector that has been generated specifically for that type of model.

Thus, multiple different models may each analyze feature vectors that have been made specifically for that model but that originate from the same issue. That is, the issue information may be sent to multiple feature generators, each of which generate a specific feature vector for its associated model. In other examples, the feature generation component may be used to determine, based on the received issue information, which feature generator should be used to create the feature vector.

In operation 240 the probability determination is provided to a client device. In some cases, more than one issue may be present in the client. In such cases, the order of the reported issues may be listed or ranked based on certain criteria. For example, the issues may be listed in order of a probability that the detected issue is a bug, that the detected issue is a false positive, a length of time the issue has been present and so on.

In operation 250 a determination is made as to whether feedback for a particular issue has been received. For example, a determination may be made as to whether a developer has selected a particular issue, analyzed the issue to confirm whether the issue is a bug or a false positive, and, if the issue is a bug, provide a fix to the issue. If feedback has not been received, flow may proceed back to operation 210 and the operations repeat.

However, if an issue has been selected and either fixed or it has been determined that the issue was a false positive (e.g., by a developer), and feedback has been provided, flow proceeds to operation 260. In operation 260, the feedback may be used to train the various components of the system. For example, the feedback may be used to train the models in the evaluation component and/or the various feature generators in the feature generation component. The feedback, along with the information about the issue, may also be stored in a storage layer of the system.

Figure 3:
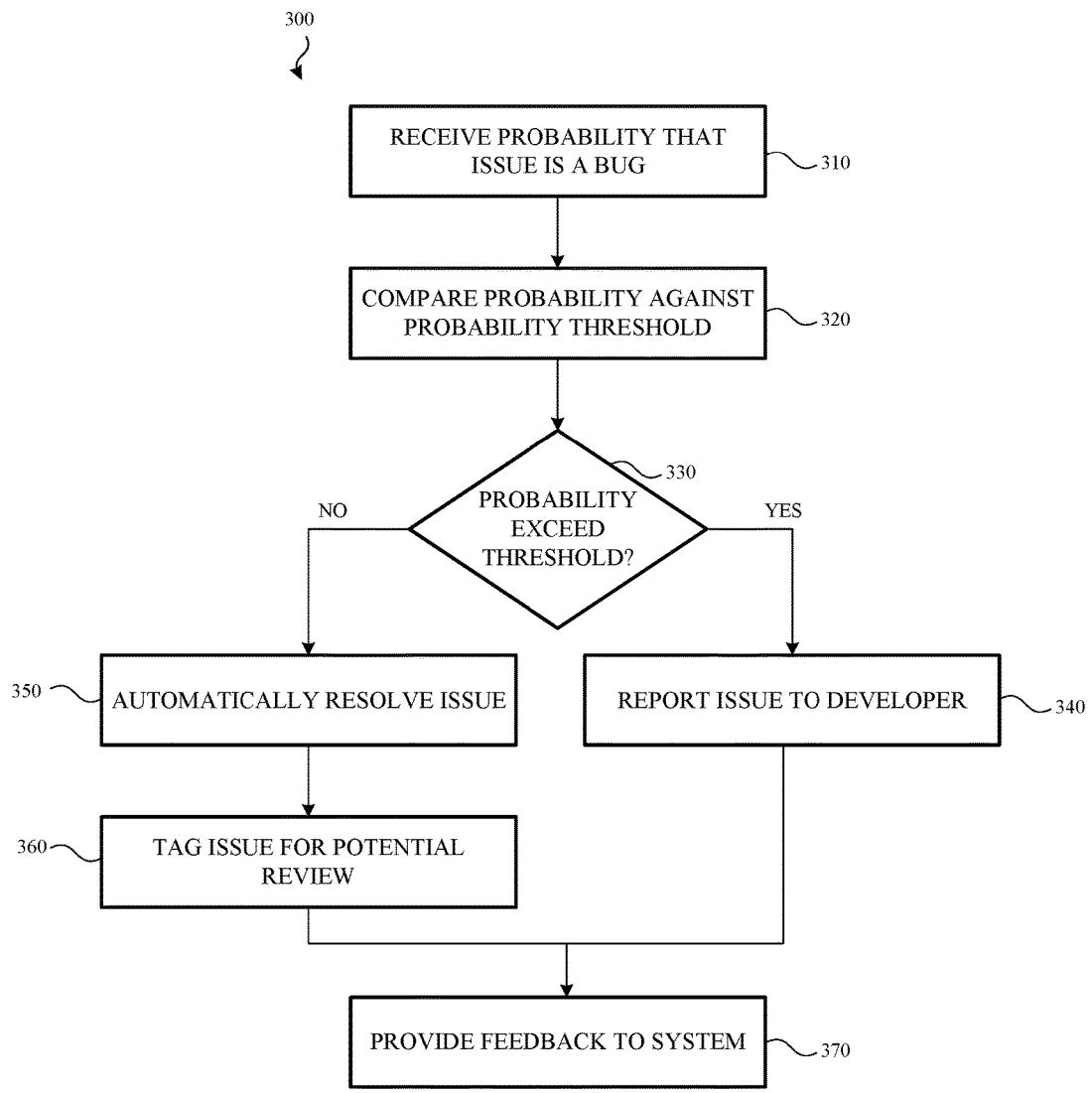
FIG. 3 illustrates a method for automatically resolving issues that arise in a software system according to examples.

FIG. 3 illustrates a method 300 for automatically resolving issues that arise in a software system according to examples. In some cases, the method 300 may be used by the system 100 described above with respect to FIG. 1.

Method 300 begins at operation 310 in which a probability (or other ranking and/or scoring indicator) is received as to whether a detected issue is a bug. In other implementations, the probability received in operation 310 may be a probability that the issue is a false positive. In either case, the probability may be received by a model associated with an evaluation component.

Flow then proceeds to operation 320 in which the probability that was received in operation 310 is compared against a probability threshold. In some cases, the probability threshold may be set be a developer. In other cases, the probability threshold may be automatically adjusted by the system based, at least in part, on feedback provided by the developer. For example, if the system determines that an issue is a bug and the developer later confirms that determination, the probability threshold may be altered accordingly (e.g., raised or lowered). If the developer has to correct the determination, the probability threshold may be also be changed.

In some cases, each type of issue may be associated with a different probability threshold. In such cases, the probability threshold associated with the particular issue may be adjusted based on the feedback received from the developer. In other cases, all reported issues may be associated with the same probability threshold and adjusted regardless of the type of issue reported and automatically addressed by the system.

Flow then proceeds to operation 330 and a determination is made as to whether the probability exceeds the probability threshold. If the probability does exceeds the threshold, flow proceeds to operation 340 and the issue is reported to the developer in the manner described above with respect to FIG. 2. Flow then proceeds to operation 370 and any developer feedback is provided to the system and used to train the models and/or the feature generators such as described above.

However, if it is determined that the probability does not exceed the threshold (e.g., it is determined that the detected issue is not a bug), the issue is automatically resolved by the system in operation 350. Flow then proceeds to operation 360 and the issue is tagged or otherwise marked indicating that a developer may want to review the resolution of the issue. Flow then proceeds to operation 370 and any received feedback (e.g., positive feedback and/or negative feedback) from the developer may be provided to the system and used to train the various components of the system such as described above.

Figure 4:
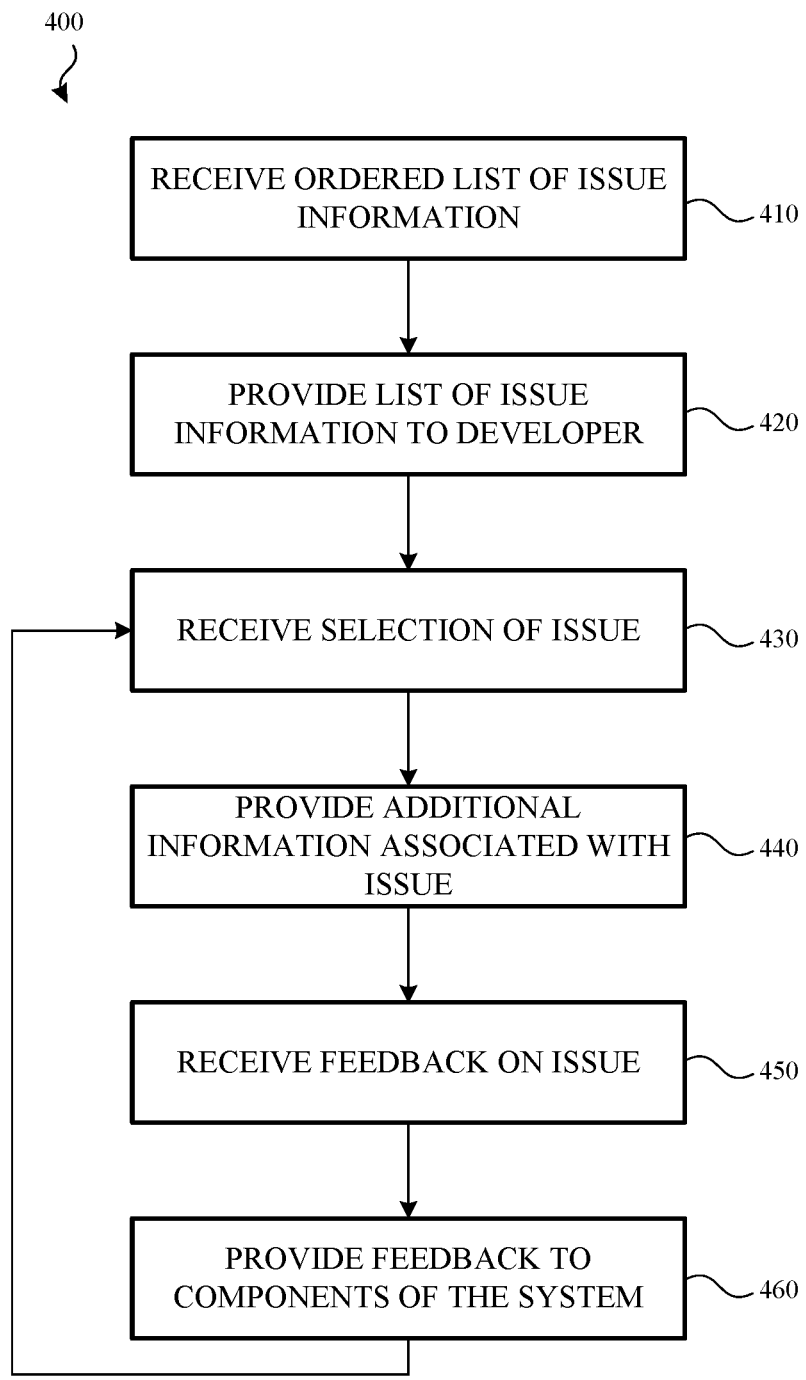
FIG. 4 illustrates a method for receiving feedback for a detected issue according to examples.

FIG. 4 illustrates a method 400 for receiving feedback for a detected issue. In some cases, the method 400 may be used by the system 100 described above. Further, the method 400 may be used by a client device that provides issue information to a developer.

Method 400 begins at operation 410 in which an ordered list of issue information is received by the client device. In some cases, the ordered list of issue information is received by an evaluation component, such as, for example, evaluation component 155. In other cases, the list of issue information may be received from issue information stored in a storage device associated with the system.

The list may be ordered on any number of factors. For example, the list could be ordered based on a probability that an issue is a bug, a probability that the issue is a false positive, the date the issue was detected, the frequency of the detection and so on. In other cases, the list of issues may be presented in a random order, a first in, first out, order, a last in, first out order and so on.

Once the issue information has been received, flow proceeds to operation 420 and the list of issues are provided to a developer. Once received, the client device may receive a selection of a particular issue (operation 430) and in response to the selection, provide additional information (operation 440) about the issue. For example, the client device may provide the time and date of the issue, which module or component the issue was detected in, the area of source code the issue originates in, and so on.

Flow then proceeds to operation 450 in which feedback about the issue is received. In some cases, the feedback may be provided by a developer once the developer has researched the issue. For example, the feedback may confirm that the issue was a bug, indicate that the issue was not a bug as indicated by the system, confirm that the issue was a false positive, or indicate that the issue was not a false positive as indicated by the system. In some cases, the feedback may also include source code corrections, source code updates or other feedback on how the issue was resolved.

Once the feedback is received, flow proceeds to operation 460 and the feedback is provided to the system. In some cases, the feedback is used to the train the various components of the system. For example, the feedback may be used to train or update one or more models of an evaluation component, create one or more models of an evaluation component, train or update one or more feature generators of a feature generation component and/or create one or more feature generators of a feature generation component. In some cases, the feedback may also be stored in a storage device of the system.

Once the feedback has been received, the method, or portions of the method may repeat. For example, as shown in FIG. 4, once feedback is received, flow may proceed back to operation 430 in which a developer selects another issue in the list and the process repeats.

In some instances, additional issues may be detected or provided to the client device as the developer is researching a selected issue. In such cases, the ordered list of issue information may continuously be updated. In other cases, the list of issue information may be provided to the client device periodically, on-demand or any combination thereof.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of electronic device configurations that may be utilized for practicing aspects of the disclosure, as described herein.

Figure 5:
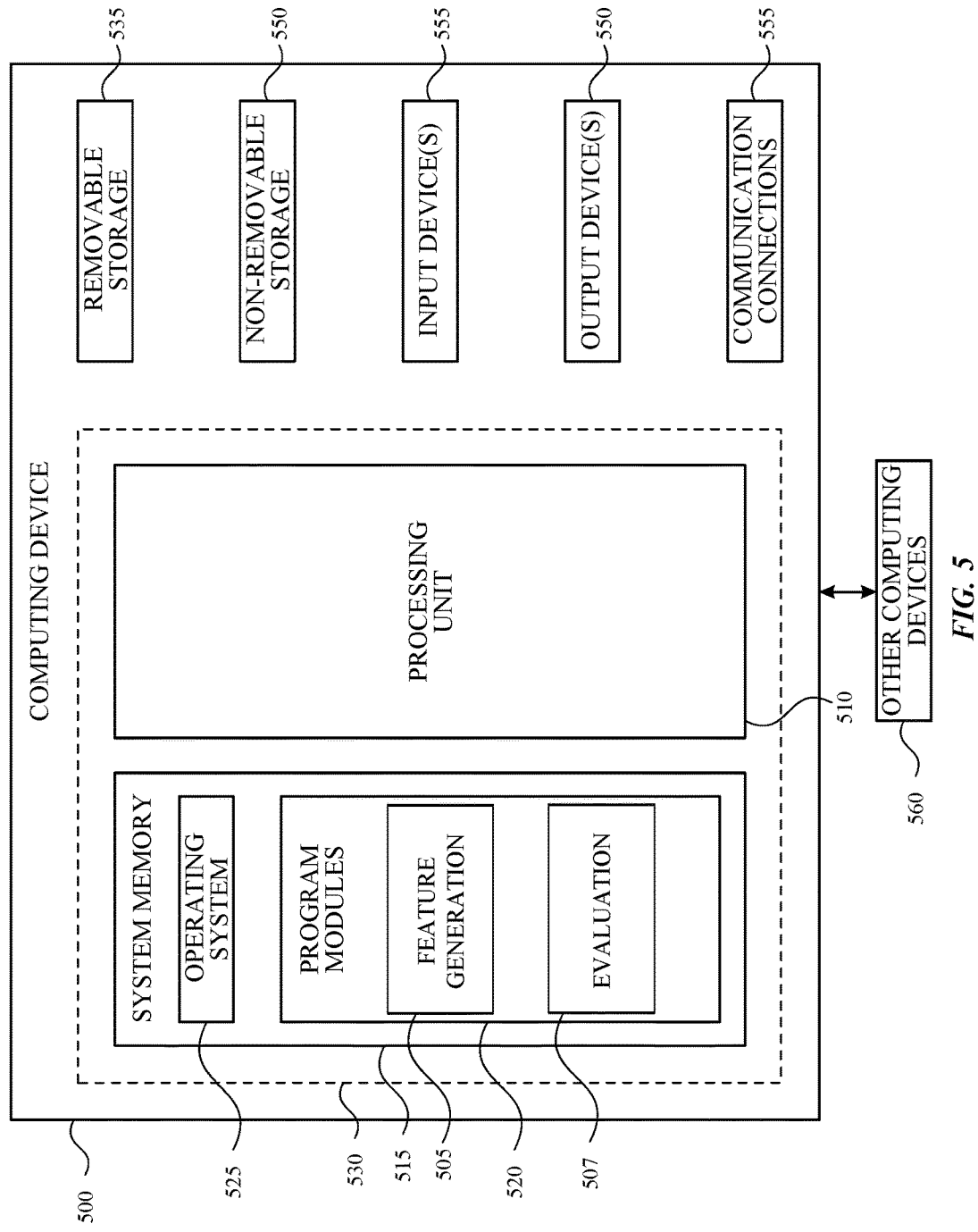
FIG. 5 is a block diagram illustrating example physical components of a computing device with which aspects of the disclosure may be practiced.

FIG. 5 is a block diagram illustrating physical components (e.g., hardware) of an electronic device 500 with which aspects of the disclosure may be practiced. The components of the electronic device 500 described below may have computer executable instructions for automatically identifying issues in a software suite such as described above.

In a basic configuration, the electronic device 500 may include at least one processing unit 510 and a system memory 515. Depending on the configuration and type of electronic device, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 suitable for identifying various issues such as described herein.

The operating system 525, for example, may be suitable for controlling the operation of the electronic device 500. Furthermore, examples of the disclosure may be practiced in conjunction with a graphics library, other operating systems, or any other application program and is not limited to any particular application or system. This basic configuration is illustrated in FIG. 5 by those components within a dashed line 530.

The electronic device 500 may have additional features or functionality. For example, the electronic device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 (e.g., a feature generation module 505 or component, an evaluation module 507 or component etc., which may comprise system 100) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The electronic device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other electronic devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 500. Any such computer storage media may be part of the electronic device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
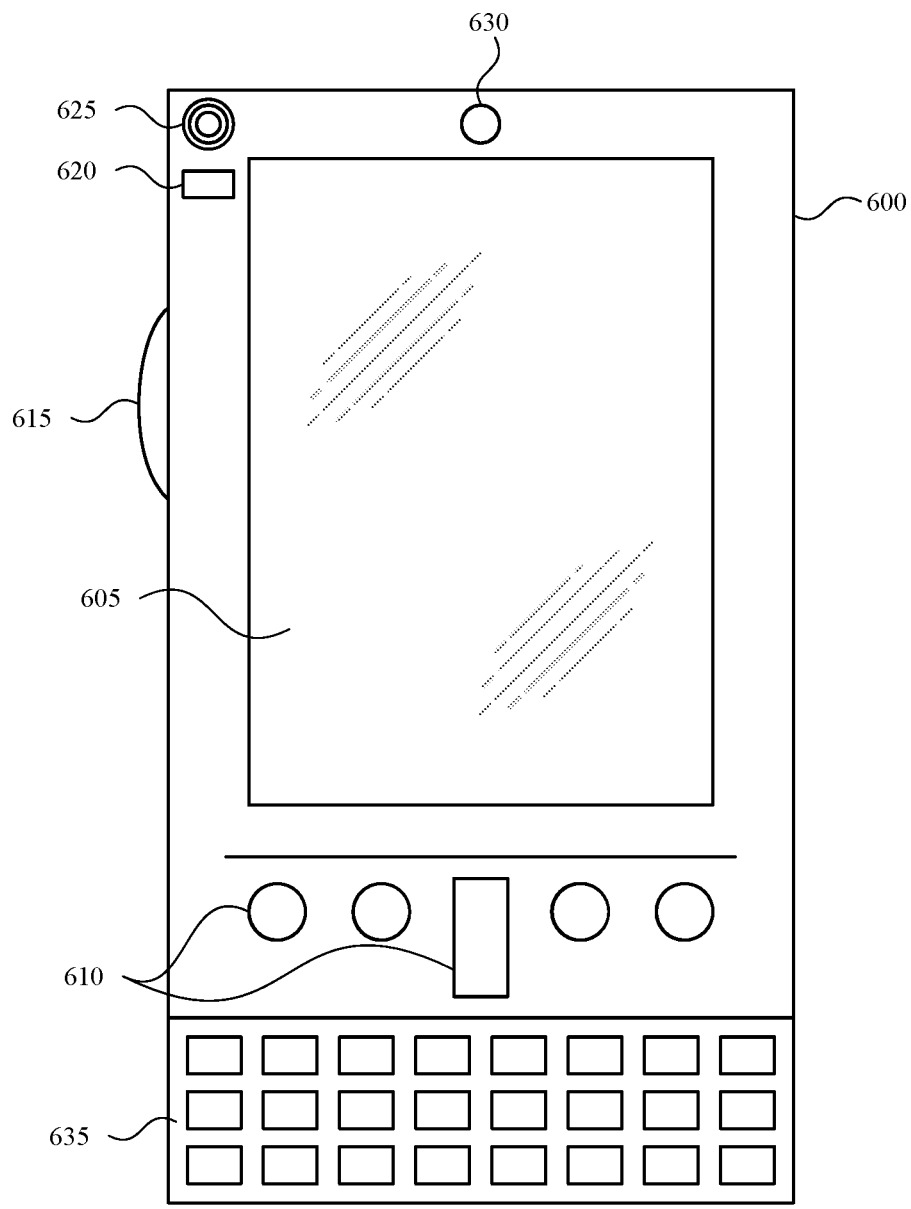
FIGS. 6A and 6B are simplified block diagrams of a mobile computing device with which aspects of the present disclosure may be practiced.
Figure 6B:
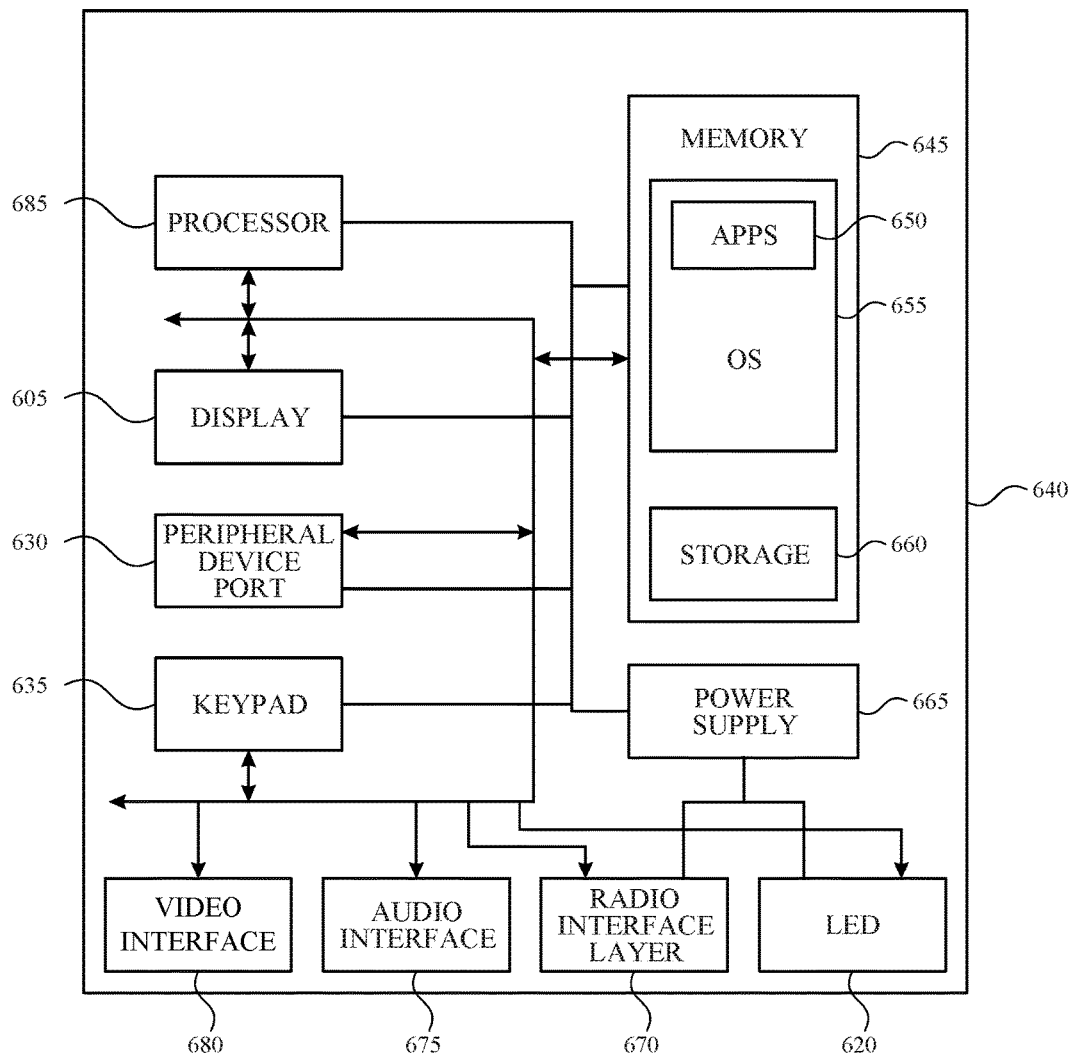

FIGS. 6A and 6B illustrate a mobile electronic device 600, for example, a mobile telephone, a smart phone, wearable computer (such as a smart watch), a tablet computer, a laptop computer, and the like, with which examples of the disclosure may be practiced. With reference to FIG. 6A, one aspect of a mobile electronic device 600 for implementing the aspects is illustrated.

In a basic configuration, the mobile electronic device 600 is a handheld computer having both input elements and output elements. The mobile electronic device 600 typically includes a display 605 and one or more input buttons 610 that allow the user to enter information into the mobile electronic device 600. The display 605 of the mobile electronic device 600 may also function as an input device (e.g., a display that accepts touch and/or force input).

If included, an optional side input element 615 allows further user input. The side input element 615 may be a rotary switch, a button, or any other type of manual input element. In alternative aspects, mobile electronic device 600 may incorporate more or less input elements. For example, the display 605 may not be a touch screen in some examples. In yet another alternative embodiment, the mobile electronic device 600 is a portable phone system, such as a cellular phone. The mobile electronic device 600 may also include an optional keypad 635. Optional keypad 635 may be a physical keypad or a "soft" keypad generated on the touch screen display.

In various examples, the output elements include the display 605 for showing a graphical user interface (GUI), a visual indicator 620 (e.g., a light emitting diode), and/or an audio transducer 625 (e.g., a speaker). In some aspects, the mobile electronic device 600 incorporates a vibration transducer for providing the user with tactile feedback. In yet another aspect, the mobile electronic device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile electronic device 600. That is, the mobile electronic device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area

660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the user takes action to indicate the powered-on status of the device.

The audio interface 675 is used to provide audible signals to and receive audible signals from the user (e.g., voice input such as described above). For example, in addition to being coupled to the audio transducer 625, the audio interface 675 may also be coupled to a microphone to receive audible input, such as to facilitate a telephone conversation. In accordance with examples of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like.

A mobile electronic device 600 implementing the system 640 may have additional features or functionality. For example, the mobile electronic device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile electronic device 600 and stored via the system 640 may be stored locally on the mobile electronic device 600, as described above, or the data may be stored on any number of storage media that may be accessed by the device via the radio interface layer 670 or via a wired connection between the mobile electronic device 600 and a separate electronic device associated with the mobile electronic device 600, for example, a server computer in a distributed computing network, such as the Internet. As should be appreciated such data/information may be accessed via the mobile electronic device 600 via the radio interface layer 670 or via a distributed computing network. Similarly, such data/information may be readily transferred between electronic devices for storage and use according to well-known data/information transfer and storage means, including electronic mail and collaborative data/information sharing systems.

As should be appreciated, FIG. 6A and FIG. 6B are described for purposes of illustrating the present methods and systems and is not intended to limit the disclosure to a particular sequence of steps or a particular combination of hardware or software components.

Figure 7:
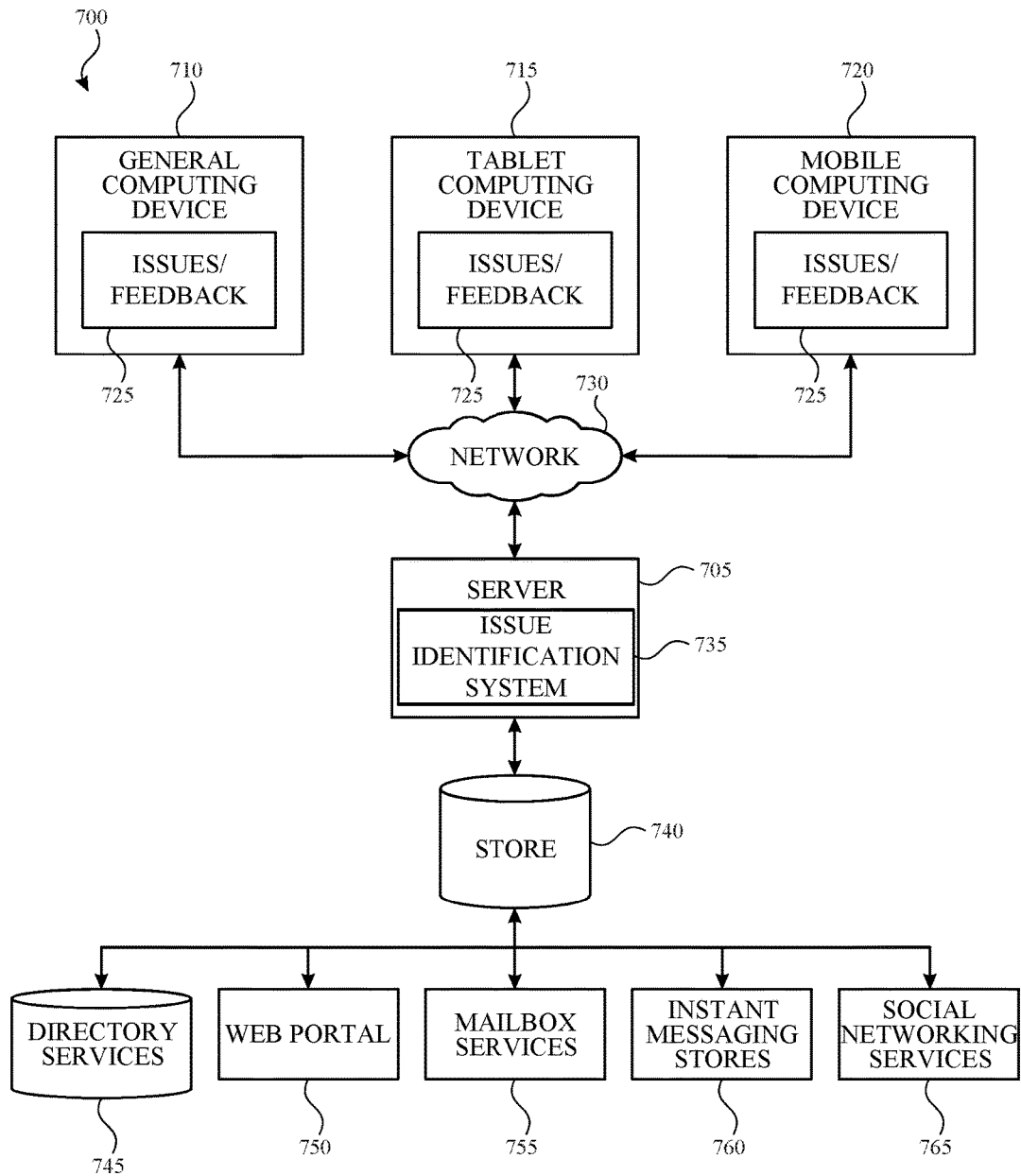
FIG. 7 is a simplified block diagram of a distributed computing system in which aspects of the present disclosure may be practiced.

FIG. 7 illustrates one aspect of the architecture of a system 700 for automatically reporting detected issues with software systems such as described herein. The system 700 may include a general electronic device 710 (e.g., personal computer), tablet electronic device 715, or mobile electronic device 720, as described above. Each of these devices may include be used to receive reported issues and/or provide feedback 725 such as described.

In some aspects, each of the general electronic device 710 (e.g., personal computer), tablet electronic device 715, or mobile electronic device 720 may receive various other types of information or content that is stored by or transmitted from a directory service 745, a web portal 750, mailbox services 755, instant messaging stores 760, or social networking services 765.

In aspects, the issues and/or feedback 725 may be provided, through network 730, to the issue identification system 735 (or components of the issue identification system) on a server 705 (although the issue identification system 735 may also be a local system).

By way of example, the aspects described above may be embodied in a general electronic device 710 (e.g., personal computer), a tablet electronic device 715 and/or a mobile electronic device 720 (e.g., a smart phone). Any of these examples of the electronic devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
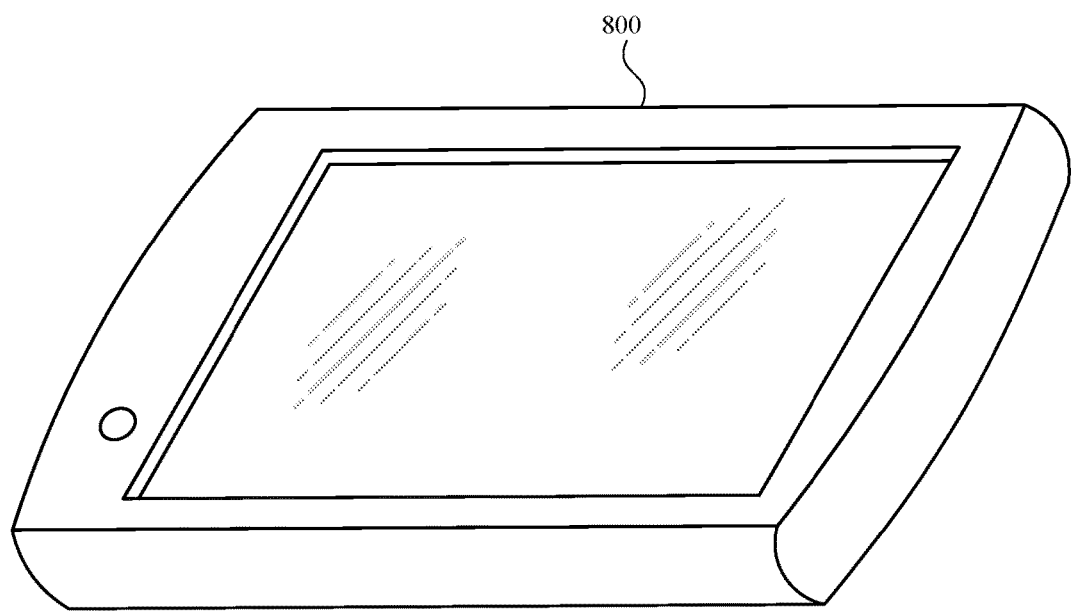
FIG. 8 illustrates a tablet computing device for executing one or more aspects of the present disclosure.

FIG. 8 illustrates an example tablet electronic device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, the figures herein FIG. 8 is described for purposes of illustrating the present methods and systems and is not intended to limit the disclosure to a particular sequence of steps or a particular combination of hardware or software components.

As described above, disclosed herein is a method for automatically determining whether a detected issue in a computing system is a bug, comprising: receiving information about a detected issue; storing the information about the detected issue in a storage device; generating a feature vector for the detected issue; analyzing the feature vector to determine a probability that the detected issue is a bug, wherein the analysis is based, at least in part, on the feature vector; and when the probability is above a threshold, reporting the detected issue to a client device. In further examples, the method includes receiving a fix to the detected issue. In further examples, the method includes updating the analyzation based, at least in part, on the received fix to the detected issue. In further examples, the method includes associating the fix with the detected issue; and storing the fix in the storage device. In further examples, the method includes prioritizing the detected issue with respect to one or more additional detected issues. In further examples, the method includes generating a feature vector comprises performing one or more transformations on the information about the detected issue. In further examples, the one or more transformations are selected from a group comprising: normalization, counting occurrences of key words from a stack trace, and binning.

Also described is a system, comprising: at least one processing unit; and a memory storing computer executable instructions that, when executed by the at least one processing unit, cause the system to perform a method for detecting occurrences of issues in a software system, comprising: receiving information about a detected issue; comparing a fingerprint of the detected issue to one or more fingerprints of previously detected issues to determine whether the detected issue is new; when it is determined that the detected issue is new: storing the information about the detected issue in a storage device; providing the information about the detected issue to a feature generation component that generates a feature vector for the detected issue; providing the feature vector to an evaluation component that analyzes the feature vector to determine a probability that the detected issue is a bug; and providing an ordered list of detected issues. In further examples, the evaluation component is associated with one or more models and wherein each of the one or more models are configured to evaluate a received feature vector based, at least in part, on information contained in the feature vector. In further examples, the memory stores instructions for receiving a fix to the detected issue. In further examples, the memory stores instructions for associating the fix with the detected issue. In further examples, the memory stores instructions for updating one or more models of the evaluation component based, at least in part, on the fix. In further examples, an order of the ordered list is based on the determined probability. In further examples, the memory stores instructions for assigning a priority to the detected issue in view of previously detected issues. In further examples, the memory stores instructions for storing information about the detected issue in the storage device when it is determined that the detected issue is not a bug.

Also described is a computer-readable storage medium storing computer executable instructions that, when executed by a processing unit, causes the processing unit to perform a method, comprising: generating a feature vector for a detected issue using information associated with the detected issue; providing the feature vector to one or more models of an evaluation component; causing the one or more models of the evaluation component to analyze the feature vector to determine a probability that the detected issue is a bug; reporting the occurrence of the detected issue; receiving a fix to the detected issue; and updating at least one of the one or more models using the fix to the detected issue. In further examples, the memory stores instructions for storing the fix in a storage device. In further examples, the memory stores instructions for associating the fix with the detected issue. In further examples, the memory stores instructions for storing the information about the detected issue. In further examples, the memory stores instructions for determining which model of the one or more models is configured to analyze the feature vector.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for automatically determining whether a detected issue in a computing system is a bug, comprising:
   receiving information about a detected issue;
   storing the information about the detected issue in a storage device;
   generating a feature vector for the detected issue;
   analyzing the feature vector to determine a probability that the detected issue is a bug caused by an alteration of at least a portion of source code used by the computing system, wherein the analysis is based, at least in part, on the feature vector;
   when the probability is above a threshold, reporting the detected issue to a client device;
   receiving input corresponding to the detected issue, the input indicating whether the detected issue is a bug;
   using the input to update the information about the detected issue in the storage device; and
   providing the updated information to a system that identified the detected issue to automatically train the system.

2. The method of claim 1, wherein the input comprises a solution to the detected issue.

3. The method of claim 2, further comprising updating the analysis based, at least in part, on the received solution to the detected issue.

4. The method of claim 2, further comprising:
   associating the solution with the detected issue; and
   storing the solution in the storage device.

5. The method of claim 1, further comprising prioritizing the detected issue with respect to one or more additional detected issues.

6. The method of claim 1, wherein generating a feature vector comprises performing one or more transformations on the information about the detected issue.

7. The method of claim 6, wherein the one or more transformations are selected from a group comprising: normalization, counting occurrences of key words from a stack trace, and binning.

8. A system, comprising:
at least one processing unit; and
a memory storing computer executable instructions that, when executed by the at least one processing unit, cause the system to perform a method for detecting occurrences of issues in a software system, comprising:
receiving information about a detected issue;
comparing a fingerprint of the detected issue to one or more fingerprints of previously detected issues to determine whether the detected issue is new;
when it is determined that the detected issue is new:
storing the information about the detected issue in a storage device;
generating a feature vector for the detected issue;
analyzing the feature vector to determine a probability that the detected issue is a bug caused by an alteration of at least a portion of source code used by the system;
providing an ordered list of detected issues to a client device;
receiving input corresponding one or more of the detected issues in the ordered list of detected issues, the input indicating whether the detected issue is a bug or a false positive; and
using the input to update the information about the detected issue.

9. The system of claim 8, further comprising instructions for using one or more models to evaluate a received feature vector based, at least in part, on information contained in the feature vector.

10. The system of claim 8, further comprising instructions for receiving a solution to the detected issue.

11. The system of claim 10, further comprising instructions for associating the solution with the detected issue.

12. The system of claim 10, further comprising instructions for updating one or more models based, at least in part, on the solution.

13. The system of claim 8, wherein an order of the ordered list is based on the determined probability.

14. The system of claim 8, further comprising instructions for assigning a priority to the detected issue in view of previously detected issues.

15. The system of claim 8, further comprising instructions for storing information about the detected issue in the storage device when it is determined that the detected issue is not a bug.

16. A computer-readable storage medium storing computer executable instructions that, when executed by a processing unit, causes the processing unit to perform a method, comprising:
generating a feature vector for a detected issue using information associated with the detected issue;
analyzing the feature vector using one or more models to determine a probability that the detected issue is a bug caused by an alteration of at least a portion of source code;
reporting the occurrence of the detected issue;
receiving input that indicates whether the detected issue is a false positive or a bug;
receiving a solution to the detected issue when the input indicates the detected issue is a bug; and
updating at least one of the one or more models using the solution to the detected issue.

17. The computer-readable storage medium of claim 16, further comprising instructions for storing the solution in a storage device.

18. The computer-readable storage medium of claim 16, further comprising instructions for associating the solution with the detected issue.

19. The computer-readable storage medium of claim 16, further comprising instructions for storing the information about the detected issue.

20. The computer-readable storage medium of claim 16, further comprising instructions for determining which model of the one or more models is configured to analyze the feature vector.

* * * * *